March 1, 1960 F. B. DOEPKER 2,926,929
DRAFT BAR AND CARRIER FOR HARROWS AND THE LIKE
Filed Oct. 10, 1958 3 Sheets-Sheet 1

INVENTOR
FRANCIS BERNARD DOEPKER
by R. J. Filipkowski
AGENT

March 1, 1960 F. B. DOEPKER 2,926,929
DRAFT BAR AND CARRIER FOR HARROWS AND THE LIKE
Filed Oct. 10, 1958 3 Sheets-Sheet 3
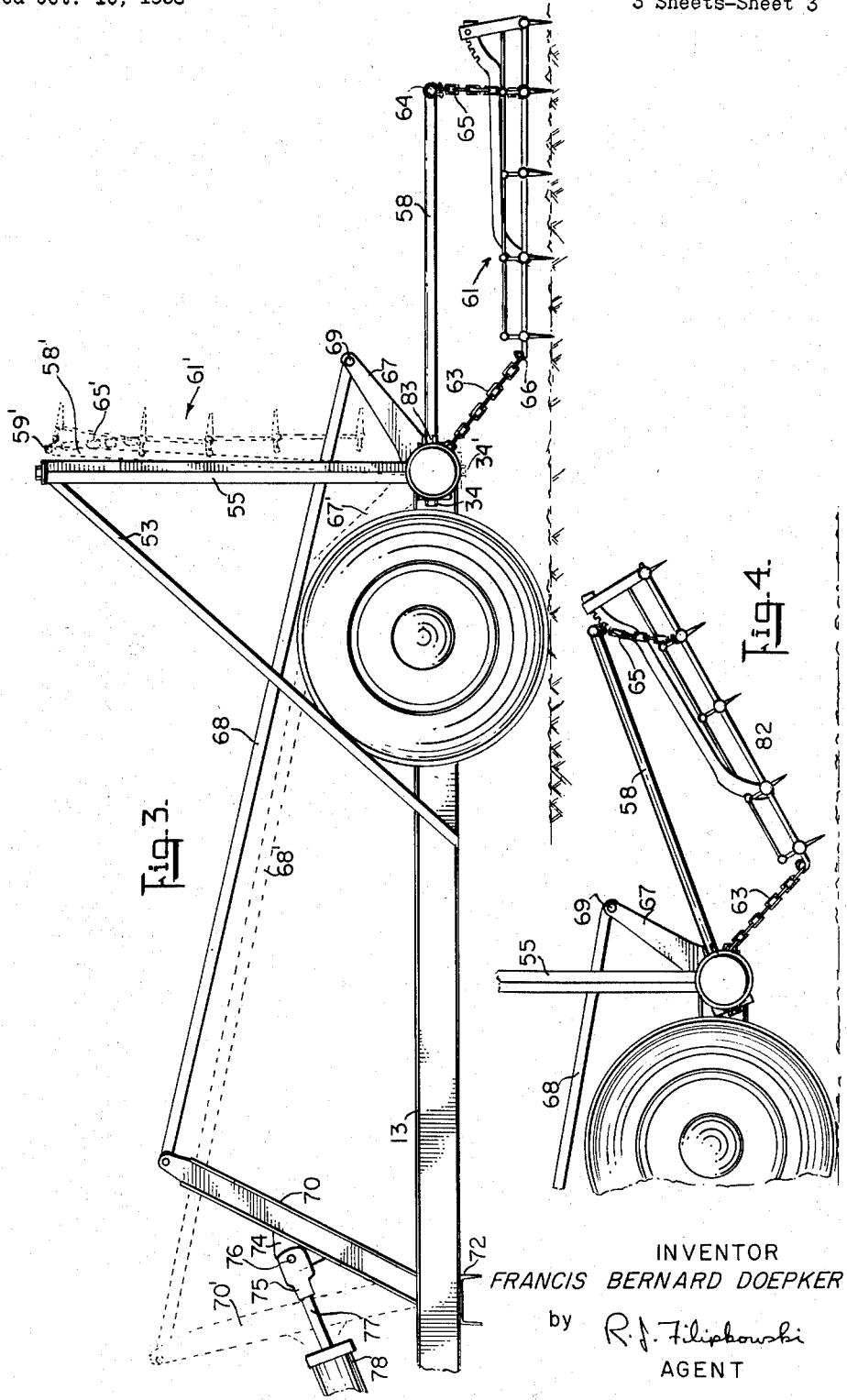
INVENTOR
FRANCIS BERNARD DOEPKER
by R. J. Filipkowski
AGENT ial Office 2,926,929
Patented Mar. 1, 1960

2,926,929

DRAFT BAR AND CARRIER FOR HARROWS AND THE LIKE

Francis Bernard Doepker, Annaheim, Saskatchewan, Canada

Application October 10, 1958, Serial No. 766,500

5 Claims. (Cl. 280—411)

This invention relates in general to earth-tilling agricultural implements, and more specifically relates to a foldable extended draw bar for dragging and for carrying gang harrows, the draw bar being supported on ground engaging wheeled truck structure and being rotatable under power for elevating harrows clear of the ground.

The principal object of this invention is to provide a rotatable, folding draft and support member which comprises two outer wing draft bars hinged to a centre or intermediate section in such manner that in one rotated position the outer wings may be pivotal forwardly with respect to the centre portion to rest upon a wheeled truck frame.

A further object of the invention is to provide a wheeled draft and elevating structure for towing and lifting gang harrow sections when the draw bar is in its lowered and extended position with the wing bars aligned with the centre section, including powered means for rotating the entire draw bar and thereby elevating all of the harrow sections clear of the earth.

It is yet another object of this invention to provide a draft and support structure for harrows comprising a truck having a pair of spaced apart ground engaging wheels, wherein the structure includes pivotable wing bars mounted upon the ends of a centre draft section and pivotable about parallel axes into harrow-carrying position as for example when it is desired to road the implement.

Yet a further specific object is the provision of a draft and support structure for gang harrows including a wheeled supporting frame, which is relatively simple in construction and by which the clearing of trash and the like from all harrow sections may be simultaneously effected with exceeding ease and safety, by remote control of motive power means.

The following description which contemplates the foregoing objects and from which other features and objects and purposes of the invention will become apparent, is to be read in conjunction with the accompanying figures of drawing, wherein:

Fig. 3 is an end elevation view of the draft and support structure of Fig. 1 wherein the harrows are in the operative earth-tilling position, and showing in phantom view the extreme elevated position taken by the support structure on rotation of the draw bar about its longitudinal axis;

Fig. 4 is a view similar to Fig. 3 showing the structure rotated sufficiently to raise the harrows above the ground for clearing trash therefrom; and Fig. 5 is a front elevation view of the hinge between a wing bar and the centre section of the embodiment of Fig. 1, in enlarged scale.

Figure 1:
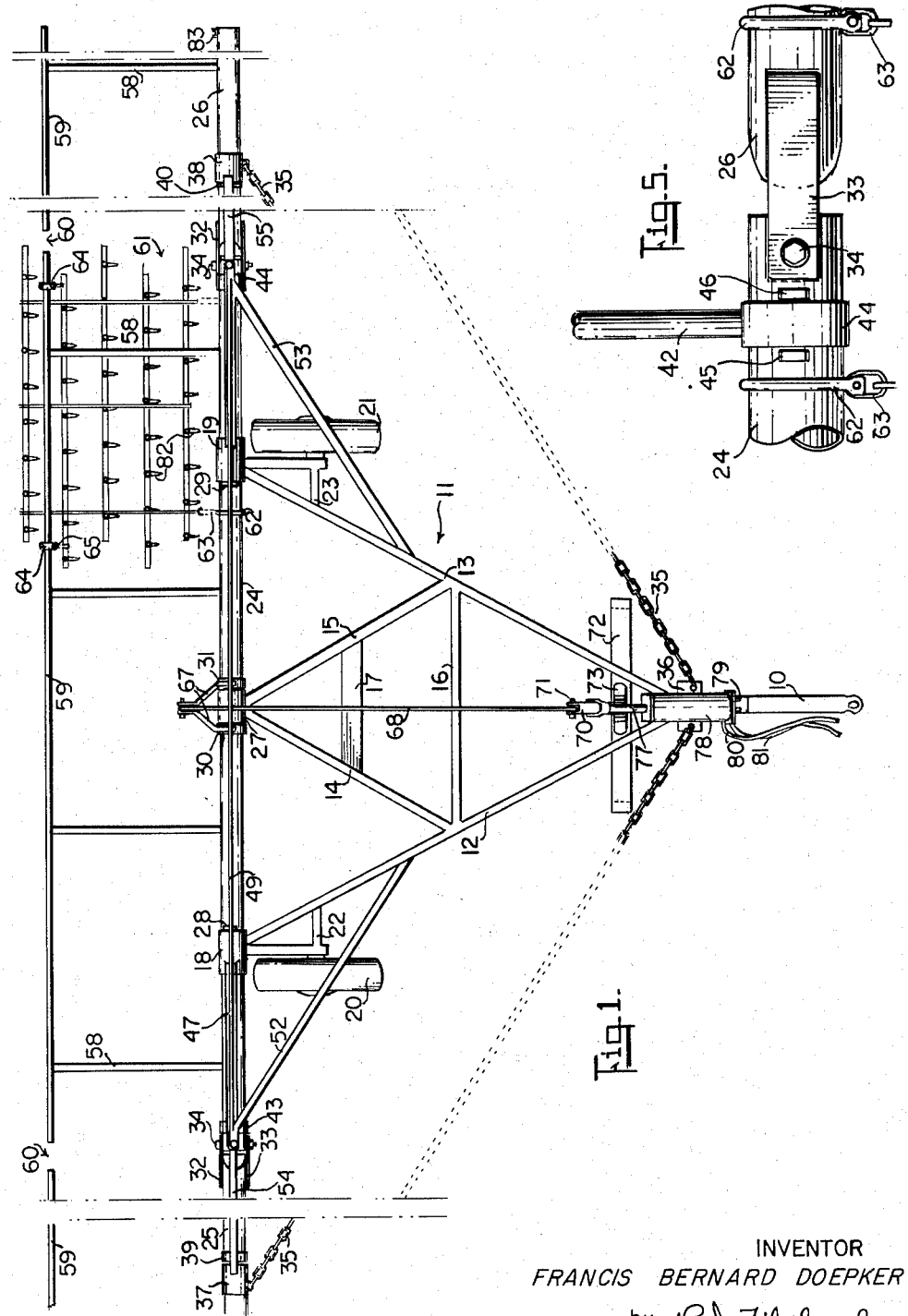
Fig. 1 is a plan view of a draft and support structure according to the invention including a centre draw bar section and a pair of wing bars, the whole supported on a wheeled truck frame.

An embodiment of the invention as shown in Fig. 1 comprises a towable draft and support structure adapted to be hitched as by its draw bar 10 to a tractor or other powered towing means (not shown). The draft and support structure is specifically realized as a triangular frame generally indicated as 11, comprising a pair of substantially horizontal side frame members 12 and 13 in V-shape joined at their forward ends to the draw bar, and braced by a system of cross frames and braces comprising the elements 14, 15, 16 and 17, all of which lie in a common plane with the side frame members. The rearward ends of the side frame members terminate in and are fixed to the aligned sleeve bearings 18 and 19 respectively. A further sleeve bearing 27 is fixed at the junction of frame braces 14 and 15, midway between the bearings 18 and 19, and is aligned with the latter. There is provided a wheeled truck assembly comprising a pair of wheels 20 and 21 whose axles are conventionally supported on respective struts 22 and 23 fixed to and braced upon the side frame members 12 and 13. The axles are aligned and are parallel with the group of bearings 18, 19, and 27.

A harrow draw bar including a centre section 24 and wing sections 25 and 26 is realized as lengths of tubular material such as steel pipe, of suitable diameter and wall thickness. The centre section is supported upon the frame 11 by means of the three aligned sleeve journals 18, 19 and 27 forming part of the frame. This portion of the draw bar is retained against longitudinal sliding movement by suitable stops 28 and 29, secured thereto, and is additionally retained by a pair of spaced fixed collars 30 and 31 closely adjacent to the opposite ends of the centre sleeve journal 27.

Each of the wing bars 25 and 26 are attached to an end of the centre section 24 by pairs of strap members 32, 33 aligned in parallel and fixed to the wing members as by welding, and pivotable upon the centre section as by bolts or pins 34 transversely of the draw bar. The pivot axes are arranged to be parallel with each other, and substantially horizontal when the harrows are in ground-engaging position. A flexible brace 35, in the form of a logging chain or the equivalent, is secured between respective collars 37, 38, and a fish plate 36 which is fast to the frame 11 adjacent its forward or hitch end. The latter collars are retained against sliding movement upon respective wing bars 25 and 26 by respective stop members 39, and 40, fixed upon the bars, on the inner sides of the collars.

Figure 2:
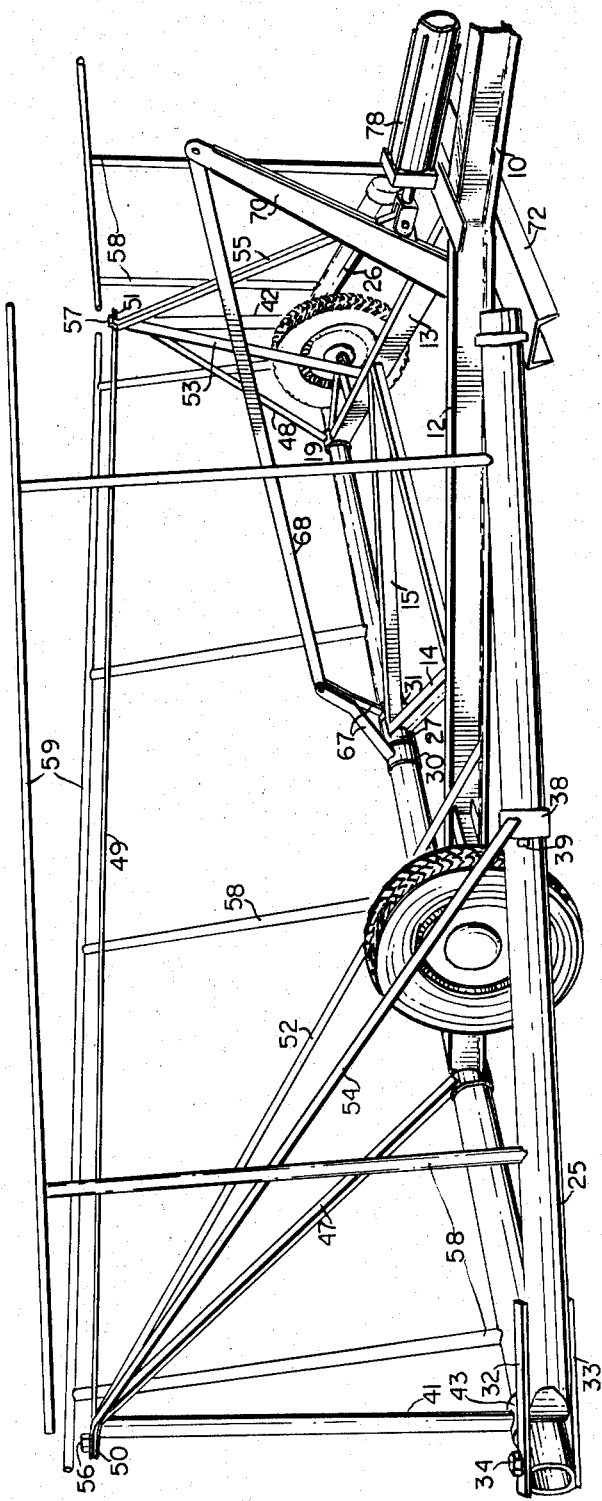
Fig. 2 is a perspective view of the embodiment of Fig. 1 wherein the wing bars and the centre portion have been rotated 90 degrees about a common longitudinal axis, and the wing bars have been subsequently swung on pivots in the ends of the centre section into the position adapted for transportation, the harrow sections having been removed for purposes of clarity.

As will appear more directly by reference additionally to Figs. 2 and 3 of the drawing, provision is made for the support of the wing bars 25 and 26 in a vertical plane against sagging, by a further frame system comprising a pair of uprights 41 and 42 carried upon respective sleeves 43 and 44 in which the outer ends of the centre bar 24 are journalled. The sleeves are in the form of relatively loose fitting collars retained against axial movement along the tubular section 24 by stop means 45 and 46 secured to the latter. Secured between the upper ends of each of the vertically disposed members 41 and 42 and the upper sides of main sleeve journals 18 and 19, are a pair of oblique strut members 47 and 48. The upper ends of each of the struts 47 and 48 are carried over the top of the verticals 41 and 42, and bent outwardly to form flattened horizontal stubs 50, 51, the stubs extending sufficiently in the directions of the wing bars to intersect the axes extended upwardly of the pins 34 and 33. A tension brace 49, in the form of a tie rod, is permanently secured between the upper ends of the verticals 41 and 42.

A further pair of struts 52 and 53 extend forwardly and inwardly, and are secured between the side frame members 12 and 13 and an upper end of each of the verticals 41 and 42. The purpose of these struts is to brace the vertical frame system comprising the elements 41, 42, 47, 48 and 49, into a substantially vertical position.

Each of the wing bars 25 and 26 is braced against sagging when the latter are aligned with the centre section, by means of tension struts 54 and 55, whose upper ends are flattened and lie upon the stubs 50 and 51 respectively, and with which they are connected for relative pivotal rotation by means of bolts 56, 57. It is to be observed that the axes of these bolts are aligned with the respective axes of the hinge pins 34 and 33 in the ends of the principal draw bar section, when the latter is rotated to fully raise the harrows. The lower ends of each of the oblique struts 54 and 55 are secured upon the relatively loose collars 37, and 38, which as has been described hereinbefore are rotatable upon the respective wing bars and are retained against inward axial movement therealong. The collars are free to move axially outwardly along the wing bars, as when an obstruction must be cleared by raising a wing bar.

Referring specifically to Fig. 1, when the three portions of the total draw bar are aligned, and the pivot pins 33 and 34 are substantialy horizontal, a set of support bars generally indicated as 58, which are secured on the rearward side of the draw bar sections, are substantially horizontal. The aforesaid support bars are conveniently realized as lengths of pipe, suitably affixed as by welding to the draw bar sections 24, 25, 26, and having their rearward ends terminating upon relatively lighter weight rods or pipes designated 59. The latter are in three sections, corresponding substantially with the lengths of the draw bar sections, except that clearance is provided between adjacent rods as indicated by reference numeral 60. In the position described, a system of gang harrows, of which only one set generally designated 61 is shown, are secured side by side in towing relation with the draft and support structure comprising the draw bar portions 24, 25, 26. The harrow sections are also attached to the transverse rods 59. To facilitate the connections, provision is made for attaching lengths of chain 63 to the clamps 62 detachably secured on the draw bar sections, and further chain lengths 65 upon clamps 64 fastened upon the rods 59. A harrow set 61 is attached at its forward hook ends 66 for towing by chains 63, and is secured at a point lying below the clamp 64 to the ends of chains 65, as will best be understood by reference to Fig. 3. It should be understood here that the exact type of harrow section employed is immaterial, and the adjustable rake type shown may be substituted by the fixed diamond section form or other harrow assemblies. In this regard, the lengths of the chains 63 and 65 are so chosen in relation to the height of the draw bar above the ground that the towing chain 63 is disposed at an angle to the horizontal not appreciably larger than about 50 degrees, in order to prevent undue lifting of the forward end of the harrow section.

The draw bar assembly is rotatable about its longitudinal axis when the wing bars are aligned with the centre portion 24, for the purpose of elevating the frame members 58 and 59, together with their attached harrow sections. For this purpose, there are rigidly secured to the collars 30 and 31 fixed to the centre draw bar section, a pair of lever arms 67 normally inclined upwardly and rearwardly. The upper ends of the arms are pinned to the rear end of a longitudinal bar 68 by means of the bolt 69, the forward end of the bar being similarly pinned rotatably to the upper end of a coupling arm 70, as by a bolt 71. The lower end of arm 70 is pivotably supported upon a transverse rest 72 secured in the forward part of the frame 11, as by the pillow blocks 73. On the forward face of the arm above the pivot, the web 74 is linked with a clevis 75 by means of a pin 76, the clevis being secured upon the end of the piston rod 77 of a hydraulic cylinder 78. The end of the cylinder remote from the clevis 75 is pivotably joined to the draw bar 10 as by fitting 79 is a conventional manner. It is believed that the working of conventional hydraulic or pneumatic piston and cylinder motor is well understood, and need not be elaborated here, and it is also believed that it will suffice to describe that suitable valve means (not shown) are provided under control of an operator, to admit fluid under controllable pressure to the respective lines 80, 81 which are connected into the cylinder and by which fluid is admitted to or withdrawn from the working faces of the piston for advancing and retracting the rod 77.

The operation of the raising mechanism may be understood from the following description. In the operative position of Fig. 3, wherein the harrows are in the lowered or ground-engaging position, the piston rod 77 has been extended outwardly from the cylinder, swinging the arm 70 in a clockwise direction, and producing a relatively magnified displacement of the pin 71, whereby the arm 67 secured to the draw bar is rotated and the bars 58 are lowered to substantially horizontal position. Conveniently, the limit of the piston stroke may be arranged to coincide with the condition that bars 58 are substantially horizontal or their rearward ends droop slightly from the horizontal. If now it is desired to elevate the harrow sections, as for example so that they clear the ground sufficiently to drop trash which may be clogging the teeth 82, fluid is caused to be admitted to or withdrawn from the respective lines 80 and 81 of the hydraulic cylinder so as to retract piston rod 77 and thereby rotate arm 70 in a counter-clockwise direction as viewed in Fig. 3. When the arm 67 has rotated through a relatively small angle, as in Fig. 4, the teeth 82 of the harrow sets 61 will have cleared the ground sufficiently for trash to drop off. In this position the sections are supported mainly by the chains 65 from the rear bars 59. By suitably manipulating the controls, to reverse the pressure relations just described, the harrow may be returned to the ground by extending piston rod 77.

In the event that it is desired to transport the draw bar, the piston rod 77 is caused to be retracted to limit of its stroke, as indicated by the alternate position 70' of the arm 70 as appears in Fig. 3, whereupon the draw bar arm 67 will have rotated to the corresponding alternate position 67' and the link 68 will lie in the new position 68'. Bars 58 have been rotated towards the vertical as shown at 58', and the harrow section 61' is supported by hanging from the chain 65' which in turn depends from the rod 59'. It will also be observed that the hinge pin 34 has been rotated in an anti-clockwise direction to the new position 34', in which it is substantially vertical. When the draw bar as a whole has been so rotated, the ends of the wing bars 25 and 26 may be swung to pivot about respective vertical axes in the upper bolts 56 and the lower pivot pins 34, to bring the outer ends of the wing bars to rest on the frame upon the ends of the transverse channel member 72. In this positoin the wing bars may be secured for purposes of transportation by locking a link of the chains 35 in the respective slotted fittings 83 secured on the bars. The slack lengths of the chains are suitably draped upon any part of the structure so as not to trail upon the ground during the moving of the implement.

It will be evident that the folded form of the harrow draw bar system has a transverse dimension substantiallly equal to the length of the central draw bar portion 24, and a length from front to rear which is not appreciably larger than the distance between the end of the draw bar 10 and the rear side of bearings 18, 19 and 27. Accordingly, the folded draw bar is readily transportable and manoeuvrable, as for example when it is required to move from field to field and to pass through gates of conventional widths.

When it is desired to restore the draw bar into its operative earth-tilling arrangement, the ends of the wing bars are unpinned and manually swung about with their harrow sets into the aligned positions, whereupon the draw bar as a whole is controllably rotated into its lowered position by the powered means described.

It will be apparent that the invention may be realized in a number of embodiments differing in form and detail from the exact constructional details herein depicted, and applicant expressly claims unto himself all equivalent structures and arrangements which fairly lie within the scope of the appended claims.

I claim:

1. A draft structure comprising a towable truck frame having a pair of ground engaging wheels, a towing hitch at its forward end and a pair of frame-supported horizontally aligned sleeve bearings spaced transversely of the towing direction, a draft bar journalling in and extending beyond said bearings, a rigid collar rotatably supported coaxially of and adjacent each end of said bar, a pair of upright columns each having its lower end secured upon a collar and having its upper end secured by bracing means to the other column and to said frame, a pair of extension draft bars each having one end connected with an end of said draft bar for relative pivotal movement about a pivot axis, said pivot axes being parallel and passing transversely through said connected ends, a pair of inclined braces each having its upper end rotatably secured in said bracing means for pivoting about a vertical axis intersecting a pivot axis in said bars, bar support means connecting a respective extension bar at a point intermediate its ends with the lower end of an inclined brace for suspension thereby and relative rotation, a lever arm secured to said draft bar, motive power means fixed in the frame and operatively linked with said arm whereby to revolve said bars about a longitudinal axis when said motive means are energized, and hangar means for attachment of tillage devices secured along one side of all said bars.

2. A draft structure as in claim 1 wherein said hangar means comprise a plurality of spaced rods disposed parallel with said bar pivot axes and arranged to extend to the rearward side of said bars when said axes are horizontal, and wherein said motive means is operable to rotate said bars through an angle of at least 90° about the longitudinal axis of said draft bar.

3. A draft structure as in claim 1 wherein said bar support means comprises a rigid ring coaxial of and rotatable about each extension bar and said extension bar includes stop means disposed inboard of a ring to limit inward axial movement of said ring relatively to said extension bar, and wherein a flexible link is joined between the forward end of said truck frame and each ring.

4. A draft structure as in claim 1 wherein said draft bar is journalled in a further frame-supported sleeve bearing horizontally aligned with said pair of bearings, and said lever arm is secured to a pair of collars fixed on said bar and disposed adjacent opposite ends of said third sleeve bearing.

5. A draft structure as in claim 1 wherein said frame includes lateral extensions adjacent its forward end adapted to support the outer ends of said extension bars in their forwardly rotated position when the said bars have been revolved to align said pivot axes with the vertical.

References Cited in the file of this patent

UNITED STATES PATENTS

| | | |
|---|---|---|
| 2,747,355 | Warne | May 29, 1956 |
| 2,750,724 | Stephenson | June 19, 1956 |
| 2,800,758 | Schmied | July 30, 1957 |
| 2,828,597 | Moore | Apr. 1, 1958 |